United States Patent [19]
Wefers et al.

[11] Patent Number: 5,103,550
[45] Date of Patent: Apr. 14, 1992

[54] METHOD OF MAKING A FOOD OR BEVERAGE CONTAINER

[75] Inventors: Karl Wefers, Apollo; Gary A. Nitowski, Natrona; Larry F. Wieserman, Apollo, all of Pa.

[73] Assignee: Aluminum Company of America, Pittsburgh, Pa.

[21] Appl. No.: 456,486

[22] Filed: Dec. 26, 1989

[51] Int. Cl.$^5$ .............................. B23P 17/00
[52] U.S. Cl. ............................ 29/527.4; 148/253; 204/38.7; 413/19; 413/20; 430/158; 430/160
[58] Field of Search .............. 148/253; 430/157, 158, 430/159, 160; 220/260; 204/33, 38.7; 413/1, 19, 18, 20; 29/527.4

[56] References Cited

U.S. PATENT DOCUMENTS

| | | | |
|---|---|---|---|
| 3,013,904 | 12/1961 | Cupery | 117/76 |
| 3,276,868 | 10/1966 | Uhlig | 430/158 X |
| 3,749,596 | 7/1973 | Yoshimura | 148/253 X |
| 3,799,848 | 3/1974 | Kolic et al. | 204/38 |
| 3,900,370 | 8/1975 | Germscheid et al. | 148/253 X |
| 4,085,012 | 4/1978 | Marceau et al. | 204/38 |
| 4,308,079 | 12/1981 | Venables et al. | 148/6.15 |
| 4,383,897 | 5/1983 | Gillich et al. | 204/33 |
| 4,388,156 | 6/1983 | Gillich et al. | 204/14 |
| 4,399,021 | 8/1983 | Gillich et al. | 204/38 |
| 4,448,647 | 5/1984 | Gillich et al. | 204/33 |
| 4,461,605 | 7/1984 | Stanek et al. | 413/19 X |
| 4,689,272 | 8/1987 | Simon et al. | 204/38.7 X |
| 4,788,176 | 11/1988 | Wieserman et al. | 502/401 |
| 4,881,975 | 11/1989 | Collier et al. | 148/253 X |

FOREIGN PATENT DOCUMENTS

| | | | |
|---|---|---|---|
| 3305354 | 8/1984 | Fed. Rep. of Germany | |
| 54-160527 | 12/1979 | Japan | 148/253 |
| 58-006639 | 2/1983 | Japan | |

OTHER PUBLICATIONS

Journal of Material Science, vol. 21 (1986) pp. 1601–1608 by Matienzo et al.
"The Surface Treatment and Finishing of Aluminum and Its Alloys", Wernick, S., ASM, Fifth Ed., vol. 1.

Primary Examiner—Carl J. Arbes
Attorney, Agent, or Firm—Andrew Alexander

[57] ABSTRACT

Disclosed is a food or beverage container or container panel comprised of an aluminum alloy body having an integral bottom and wall. An intermediate layer comprised of an aluminum oxide or aluminum hydroxide layer is bonded to the aluminum alloy body and a functionalized layer of an organo phosphonate, organo phosphinate or phosphate ester is bonded to the oxide or hydroxide layer. A polymer layer is bonded to the functionalized layer. The functionalized layer is comprised of the reaction product of phosphonic or phosphinic acid and/or phosphonic acid ester, for example.

56 Claims, 4 Drawing Sheets

METHOD OF MAKING A FOOD OR BEVERAGE CONTAINER

BACKGROUND OF THE INVENTION

1. Field of the Invention

This invention relates to a new food or beverage container or a container panel and a method for forming the same. More particularly, this invention relates to aluminum food or beverage containers having coatings of aluminum oxide or aluminum hydroxide on the metal surface and a layer of phosphonic/phosphinic or phosphoric acid ester material bonded to the oxide and/or hydroxide layer.

2. Description of the Related Art

It is well known that the natural oxide on aluminum can be reinforced or altered by several treatment methods to give better protection against corrosion or serve as a substrate for adhesive bonding. Such treatments include anodic oxidation, hydrothermal treatment in water, water vapor or aqueous solutions, or reaction treatments such as conversion coatings which employ solutions which may contain chromic acid, chromates, phosphoric acid, phosphates and fluorides.

While anodic oxides can be grown to thicknesses of tens of microns, their application is generally time consuming and requires expensive electrical equipment. Hydrothermal coatings are easier and faster to apply and require only simple equipment. They consist mostly of AlOOH or Al(OH)3 in crystalline or amorphous (gelatinous) form and are generally known as boehmite coatings as disclosed in Wernick et al, "The Surface Treatment and Finishing of Aluminum and Its Alloys", ASM Publ., 1987. These coatings offer reasonably good protection in mildly aggressive environments. Chemical conversion coatings, e.g., chromate-phosphate coatings as disclosed in Wernick et al, can be applied in several seconds to a few minutes. They afford good corrosion protection and are good bonding substrates for polymer coatings, laminates or adhesives although they do not match the adhesion and durability performance of anodic oxides applied in phosphoric acid according to U.S. Pat. No. 4,085,012.

Venables et al, U.S. Pat. No. 4,308,079, teach the treatment of an aluminum oxide surface of an aluminum substrate with a partial monomolecular layer of an amino phosphonate compound such as nitrilotris (methylene) triphosphonic acid to retard hydration of the aluminum oxide to aluminum hydroxide to provide a more stable microporous surface which is particularly suited to commercial adhesives. The formation of the hydrated oxide is said to interfere with the stability of a satisfactory bond between the adhesive and the oxide, while the phosphonate treatment to form a partial monomolecular layer is said to be sufficient to inhibit the conversion of the oxide to hydroxide without interfering with subsequent bonding of the adhesive to the oxide.

In the present invention, a novel food or beverage container or container panel and a method of making the same are provided from coated aluminum alloy sheet stock. The coating comprises a layer of aluminum oxide and/or hydroxide on the sheet and bonded thereto is a layer which is comprised of the reaction product of phosphonic, phosphinic or phosphoric acid ester compounds such as monomeric or polymeric acids.

SUMMARY OF THE INVENTION

Disclosed is a food or beverage container or container panel comprised of an aluminum alloy body having an integral bottom and wall. An intermediate layer comprised of an aluminum oxide and/or aluminum hydroxide layer is bonded to the aluminum alloy body and a functionalized layer of an organo phosphonate, organo phosphinate or phosphate ester is bonded to the oxide or hydroxide layer. A polymer layer is bonded to the functionalized layer. The functionalized layer is comprised of the reaction product of phosphonic or phosphinic acid and/or phosphoric acid ester, for example.

It is, therefore, an object of this invention to provide a novel aluminum food or beverage container or container panel.

It is a further object of this invention to provide a method of forming the food or beverage container.

And, it is a further object of this invention to provide a novel lid or end for a food or beverage container.

These and other objects of the invention will be understood from the following description and accompanying flow sheet.

DETAILED DESCRIPTION OF THE INVENTION

Figure 3:
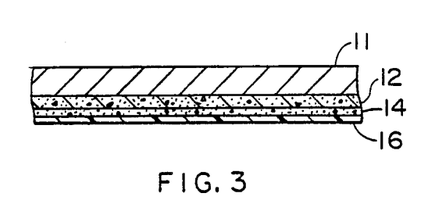
FIG. 3 is a cross section view of the lid of FIG. 1 in accordance with the invention.
Figure 4:
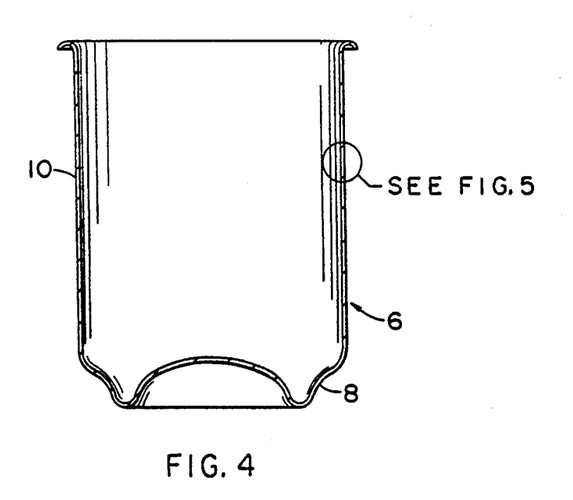
FIG. 4 illustrates a food or beverage container in accordance with the invention.
Figure 5:
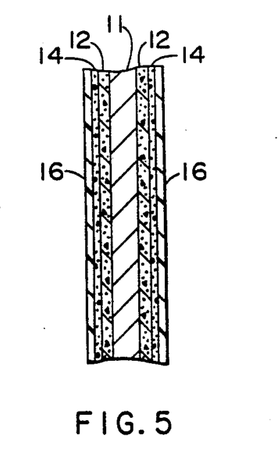
FIG. 5 is an enlarged cross section view of the container wall in accordance with the invention.

In accordance with the invention, there is shown in FIG. 4 a beverage container in accordance with the invention. The container body 6 has a wall 10 and may have an integral aluminum bottom 8, as shown in FIG. 4. As shown in FIG. 5, the bottom or side 10 of the container is comprised of an aluminum wall 11 and a layer 12 of aluminum oxide and/or aluminum hydroxide. While the coating has been shown on both sides, it may be applied to one side of the sheet which results in the inside of the container, as shown in FIG. 3. Bonded to the layer 12 of aluminum oxide or hydroxide is a layer 14 of a phosphorus-containing organic material. A polymer layer 16 is bonded to layer 14 of the phosphorus-containing organic material. Preferably, the layer of aluminum oxide or aluminum hydroxide, the phosphorus-containing organic layer and polymer layer are applied to a flat sheet product which is then formed to a container such as a food or beverage container or container panel or lids therefor. Alternatively, the treatment may be applied to the container panel or lid after forming. The layers have a high level of adherence to the aluminum body. This high level of bond strength between the layers permits the drawing or redrawing of a flat blank into the food containers, for example. Further, the flat blank permits the drawing and ironing to form a beverage container, as illustrated in FIG. 4. Even after drawing and ironing, the container wall 10 retains the polymer firmly bonded thereto.

Figure 1:
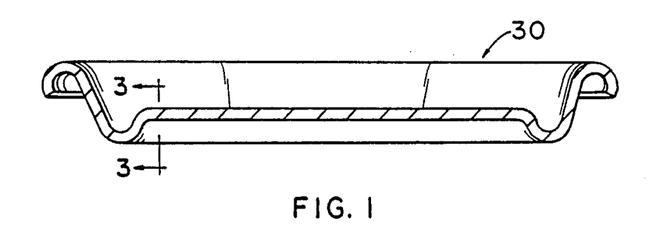
FIG. 1 illustrates a container panel or lid in accordance with invention.
Figure 2:
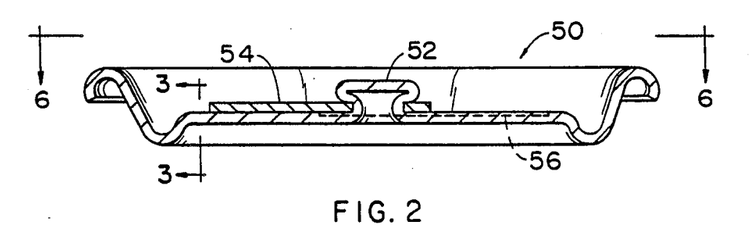
FIG. 2 is an easy open end or lid in accordance with the invention.

Likewise, a lid or end or container panel, such as shown in FIGS. 1 or 2, is provided from blanks having layers of aluminum oxide or aluminum hydroxide, of phosphorus-containing organic material and of the polymer, as noted hereinbefore.

By the use of "container panel" herein is meant to include container lids or ends, including easy open ends which have an integral rivet, top and scoreline and shallow trays such as food trays formed from aluminum foil. Foil for such uses can have a thickness in the range of 0.003 to 0.006 inch.

Figure 6:
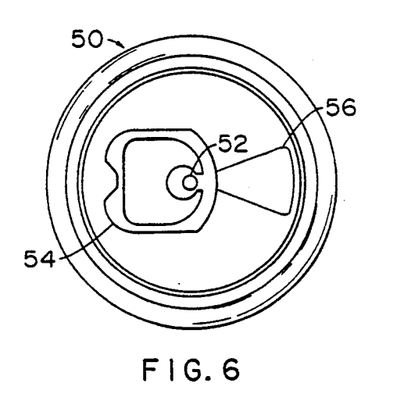
FIG. 6 is a top view of an easy open end or lid.

The lid or end design may be a conventional type 30 as shown in FIG. 1 or it may be a conventional type with an opening therein for sealing with an adhesive strip. Or, the lid design may be any of the easy open type 50 (FIGS. 2 and 6) having an integral rivet 52, a tab 54 and score line 56 defining an opening for removing contents of the container. Further, the lid or end 30 or 50 may be made by any of the well known stamping or forming processes to provide the type 30 design. Additional forming steps to provide integral rivet 52 and score line 56 may be performed without adversely affecting the layers or coatings.

Aluminum alloys for lids such as AA5182 are provided as an ingot or billet by casting techniques currently employed in the art for cast products with continuous casting being preferred. Prior to the principal working operation, such alloy stock is preferably subjected to homogenization. After homogenization, the ingot is hot worked or rolled to provide an intermediate gauge. Hot rolling is performed wherein the starting temperature for rolling is in the range of 700° to 975° F. When the use of the alloy is for beverage cans, such as end stock, the hot rolling is performed to provide an intermediate product having a thickness of about 0.190 inch to 0.130 inch. Next, this material is cold rolled to provide a sheet ranging in thickness from about 0.008 to 0.015 inch.

Aluminum alloys such as AA3004 or AA5042 for forming into cans by drawing and redrawing for food containers, for example, or drawing and ironing as for beverage containers, are first provided as an ingot and homogenized. This is followed by hot rolling to a gauge of about 0.125 inch. Typically, this is followed by anneal followed by hot rolling and then cold rolling to a final gauge sheet product in the range of 0.011 to 0.015 inch for forming into containers. Thereafter, typically blanks are cupped, wall ironed, bottom domed, necked and flanged.

Figure 7:
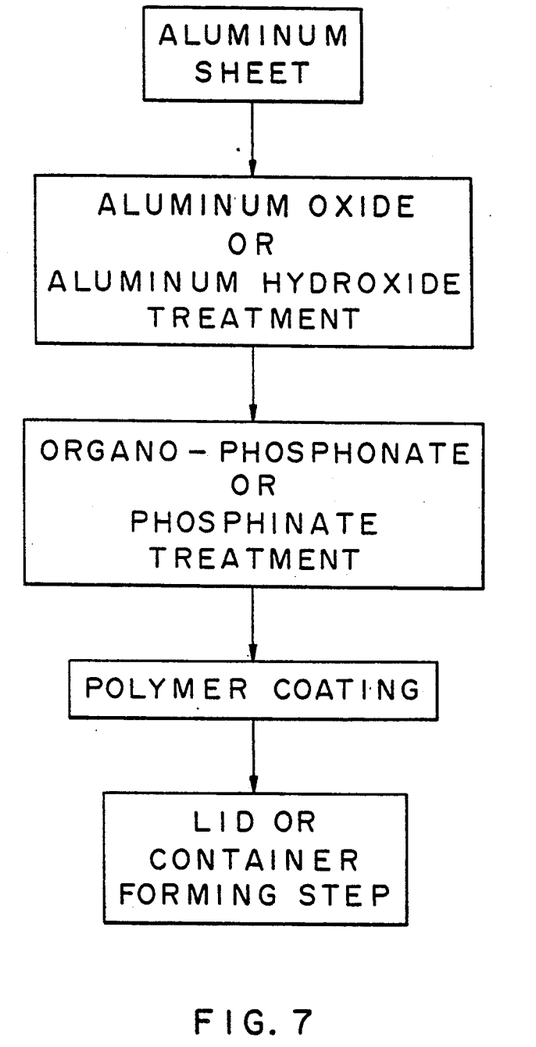
FIG. 7 illustrates the steps involved in forming a container or lid of the invention.

For sheet used for lids or containers, it is preferred that coatings or layers thereon of aluminum hydroxide or aluminum oxide, phosphonate, phosphinate and/or phosphate esters are bonded thereto and polymer is bonded to the phosphorous-containing compound. The preferred steps are shown in FIG. 7. In certain instances, applying the aluminum oxide layer and phosphonate, phosphinate or phosphate ester layer may occur in the same step, as, for example, when the sheet is anodized in phosphonic or phosphinic acid or phosphoric acid ester including hydrogen phosphonic acid to apply these layers.

Figure 8:
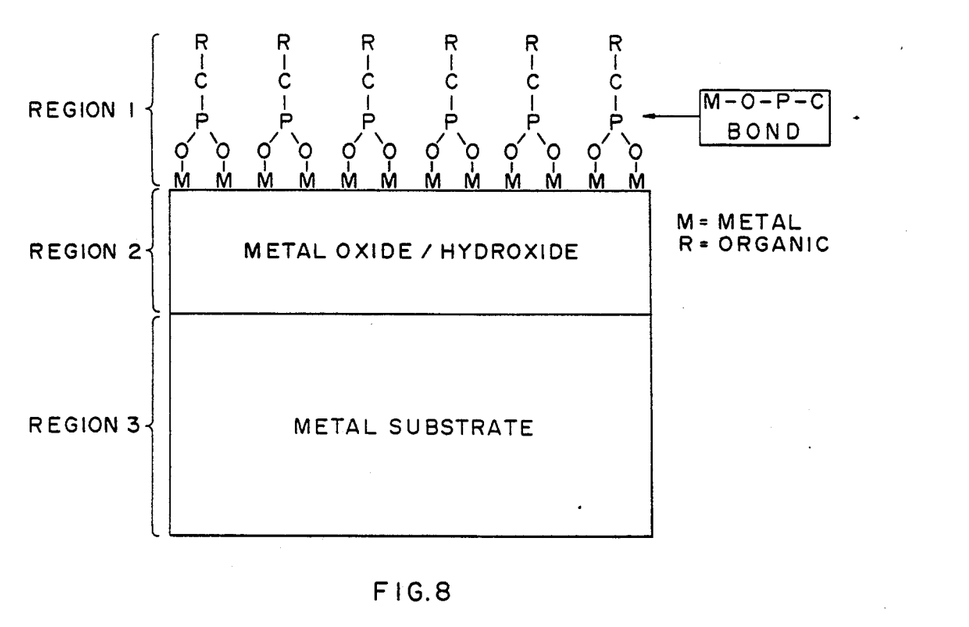
FIG. 8 shows the R groups extending away from a phosphonic acid treated surface.

In accordance with one aspect of the invention, the aluminum sheet is treated to form an aluminum hydroxide coating thereon. Bonded to the hydroxide coating is a layer consisting essentially of a reaction product of a phosphorus-containing organic acid selected from the class consisting of phosphonic acid, phosphinic acid, or a combination of these acids, referred to herein as a functionalized layer. Phosphoric acid esters may be used instead of phosphonic or phosphinic acids or in combination therewith. The acids or acid esters may be polymeric or monomeric. The reaction product, e.g., phosphonate, phosphinate or phosphate ester, in accordance with the invention, exhibits a preferred orientation such that the phosphorus groups are bonded to the aluminum hydroxide on the surface while the R groups extend away from that surface, as illustrated in FIG. 8.

By polymer as used herein is meant to include a macromolecule formed by the chemical union of five or more combining units which may be the same or different monomers, dimers, trimers, etc.

Functionalized layer as used herein means a layer which can have a chemical reactivity ranging from non-reactive to very reactive and which can be acid and base resistant, exhibit hydrophobicity or hydrophilicity, can be thermally stable at 250° C., for example, and be hydration resistant.

By aluminum hydroxide as used herein is meant to include aluminum hydroxide and aluminum hydroxide in combination with aluminum oxides.

Phosphonic acid as used herein has the formula:

$$R_m[PO(OH)_2]_n$$

wherein R may be hydrogen or is one or more radicals having a total of 1-30 carbons; m is the number of radicals in the molecule or compound and is in the range of 1-10 for monomeric acids; n is the number of phosphonic acid groups in the molecule or compound and is in the range of 1-10 for monomeric acids; and n and m can be higher for polymeric phosphonic acids.

Phosphinic acid as used herein has the formula:

$$R_m R'_o[PO(OH)]_n$$

wherein for monomeric acids, R may be hydrogen or is one or more radicals having a total of 1-30 carbons; m is the number of R radicals in the molecule or compound and is in the range of 1-10; R' may be hydrogen or may be comprised of 1-30 carbon-containing radicals; o is the number of R' radicals and is in the range of 1-10; n is the number of phosphinic acid groups in the molecule or compound and is in the range of 1-10, and for polymeric acids, the numbers for m, n and o can be considerably higher.

Phosphonic or phosphinic acid as used herein may include monomeric and polymeric phosphonic or phosphinic acids and such compounds which can form acid radicals in solution.

Phosphoric acid esters as used herein is meant to include mono-, di-, tri- to dodeca- phosphoric acid radicals and both monomeric and polymeric phosphoric acid esters, and salts thereof are useful in the invention. Phosphoric acid esters may be defined by the formula: $(RO)_m[PO(OH)_2]_n$ or $(RO)_m(R'O)_k[PO(OH)]_n$ or $(RO)_m(R'O)_k(R''O)_q[PO]_n$ wherein for monomeric acids R is one or more radicals having a total of 1-30 carbons; R' and R" is one or more radicals having a total of 1-30 carbons; m, k or q is the number of radicals RO, R'O or R"O, respectively, in the molecule or compound and is in the range of 1-12; and n is the number of phosphoric acid groups in the molecule or compound and is in the range of 1-12. For polymeric phosphoric acid ester, these numbers for m, n, k and q will be considerably higher. It will be appreciated that for polymeric phosphonic or phosphinic acids or phosphoric acid esters m, k, q, o, n can be as high as 250,000, for example.

Phosphoric acid ester salt as used herein has the formula $(RO)PO(OX)_2$ or $(RO)PO(OH)(OX)$ or $(RO)(R'O)PO(OX)$ wherein R or R' is one or more radicals having a total of 1-30 carbons and x is selected from ammonia, alkali, alkaline earth and transition metals.

In the invention, the aluminum sheet product is subjected to a hydroxylating treatment. That is, the product is treated with water, water-containing vapor, e.g., steam, or an aqueous solution having a pH in the range of 2 to 12, preferably a pH in the range of 7 to 10. This treatment forms a layer of aluminum hydroxide on the surface of the aluminum sheet product. Aluminum hydroxide as used herein may have the formula AlOOH or $Al(OH)_3$ or nonstoichiometric versions thereof and can include partially hydroxylated oxide layers, depending somewhat on the temperature of the solution. For example, while the treatment temperature of the solution can range from room temperature to about 200° C., temperatures of 70° to 200° C. tend to favor formation of AlOOH, and room temperature to about 70° C. tend to favor formation of $Al(OH)_3$. The layer of aluminum hydroxide is less than 5000Å and preferably less than 1000Å with typical thicknesses being in the range of 50 to 950Å.

While treatment with water vapor at temperatures above 100° C. provides very fast hydroxylation, the need for pressure vessels makes this approach less desirable. Sufficient hydroxylation within seconds can also be achieved by the use of mildly alkaline solutions of pH of 8-10 at temperatures near boiling.

Aqueous solutions suitable for use in providing a hydroxylated surface can be water combined with a basic material which may be organic or inorganic. Suitable basic materials which may be used include organic amines, e.g., triethanol amine, propyl amine, triethyl amine, alkali metal hydroxides, alkaline earth metal hydroxides, ammonium hydroxide and alkali metal carbonates or bicarbonates. It will be appreciated that the hydrolysis of acid salts also will result in the formation of the hydroxylated surface, e.g., treatment of an aluminum surface with water after it has been treated or immersed in an inorganic oxy acid, e.g., $H_2SO_4$ acid. To prepare the solution a sufficient amount of the basic or acidic material is added to water to adjust the pH to the desired level.

Time of treatment can be as short as one second. Treatment times can range from 1 to 100 seconds or longer, e.g., 5 to 10 minutes, with preferred times being 1 to 30 seconds, and typical times being in the range of 5 to 10 seconds.

After hydroxylating, the aluminum is treated in a solution of phosphonic acid, phosphinic acid or phosphoric acid ester, either monomeric or polymeric, a combination of such acids or phosphoric acid esters.

The solution or liquid used in the treatment of the aluminum surface preferably comprises a solvent, e.g., water, alcohol or organic solvents, with a range of concentration of from about 0.001 molar to a saturated solution, preferably about 0.1 to about 2 molar, of a 1-30 carbon, preferably 2-12 carbon, phosphonic acid; one or more 1-30 carbon, preferably 2-12 carbon, phosphinic acid; analogous phosphoric acid esters, 1-30 carbon phosphoric acid esters; or a mixture of the same. The acids may be monomeric or polymeric. The solution may be sprayed or immersed. The metal is treated by contacting the surface with the solution, which contacting can include the preferred methods of spraying or immersing.

Examples of groups which may comprise R, R, and/or R" include long and short chain aliphatic hydrocarbons, aromatic hydrocarbons, carboxylic acids, aldehydes, ketones, amines, amides, thioamides, imides, lactams, anilines, pyridines, piperidines, carbohydrates, esters, lactones, ethers, alkenes, alkynes, alcohols, nitriles, oximes, allyls, vinyl, ureas, thioureas, silanes and combinations of these groups.

Representative of the polymeric phosphonic acids are as follows: polyvinyl phosphonic acid, poly(vinylbenzyl)phosphonic acid, poly(2-propene)phosphonic acid, phosphonomethyl ethers of cellulose, phosphonomethyl ethers of polyvinyl alcohol, poly 2-butene phosphonic acid, poly 3-butene phosphonic acid, phosphonomethyl ethers of starch, polystyrene phosphonic acid, polybutadiene phosphonic acid and polyethylene imine methyl phosphonate.

Representative of the monomeric phosphonic/phosphinic acids are as follows: aminobenzylphosphonic acid, phosphomycin, 3-amino propyl phosphonic acid, vinyl phosphonic acid, allyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, ethylphosphonic acid, heptadecylphosphonic acid, hydrogen phosphonic acid, methylbenzylphosphonic acid, methylphosphonic acid, naphthylmethylphosphonic acid, octadecylphosphonic acid, octylphosphonic acid, pentylphosphonic acid, phenylphosphinic acid, phenylphosphonic acid, phosphonopropionic acid, phthalide-3-phosphonic acid and styrene phosphonic acid.

Representative of the polymeric phosphoric acid esters are polyvinyl phosphoric acid ester, dodecylpolyoxy ethylene phosphoric acid ester, phosphate-containing polymers, phosphorylated starch, complex sugars and cellulose, Fyrol 99, Fyrol 51, Tex-Wet 1131, phosphate esters of polyvinyl alcohols, polyacrylamides, homopolymers and random polymers of amino acids, polyethylene glycol, polynucleotides, polyoxyethylene and polystyrene.

Representative of monomeric phosphate esters are tris(dibromopropyl) phosphate, Thermolin 101, Phosgard 1227, Tricresyl phosphate, polyaryl phosphate, octyl phosphate, dioctyl phosphate, trioctyl phosphate, glycerol 1-phosphate, phosphonenolpyruvate, glucose 1-phosphate, pantothenic acid, phytic acid, Ethfac ®, Klearfac ®, acetyl phosphate, adenosine 2',5'-diphosphate, 3'-Adenylic acid, adenylosuccinic acid, Agrocin 84, 2-(phosphonooxy)benzoic acid, picosforic acid, mono(2-cyanophenyl)phos Meonomycin and vinyl phosphoric acid ester.

The phosphonic/phosphinic acid or phosphoric acid ester molecules such as listed above may also include inorganic groups substituted thereon such as phosphates, and the like, or groups such as phosphonates, sulfonates, or carbonates. While it is preferred that the free end of the organic group extends away from the aluminum oxide/hydroxide surface, it is within the scope of the present invention to provide, on the free end of the molecule, functional groups. The term functional group may be defined as the group on the molecule which enables the phosphonic/phosphinic acid molecule bonded to the aluminum oxide surface to react with, attract, couple to, or bond with, etc., other atoms, ions and/or molecules.

It should be noted that the free end of the phosphonic/phosphinic acid or phosphoric acid ester molecule may be further reacted after formation of the layer on the aluminum surface to provide the desired functionalization of the molecule discussed above if such functionalization of the phosphonic/phosphinic acid or phosphoric acid ester prior to treatment of the aluminum surface would interfere with such treatment or with the bond formed between the aluminum hydroxide layer formed during the treatment and the acid group of the phosphonic/phosphinic acid molecule. In this manner, chemical bonding of the phosphorus-containing acid group of the phosphonic/phosphinic acid or phosphoric acid ester molecule to the aluminum hydroxide surface can be assured.

To form the coating thereon, the aluminum surface should preferably, but not necessarily, first be cleaned to remove any contaminants or excess surface oxides using, for example, a mineral acid such as nitric, phosphoric, or sulfuric acid, or a base such as NaOH, after which the surface is rinsed with water.

After the aluminum surface has been cleaned, it may be immersed in the hydroxylating liquid maintained at a temperature in the range of from just above freezing to just below boiling, preferably from about 50° C. to about 100° C.

Subsequent treatment with phosphonic or phosphinic acid or phosphoric acid ester provides a functionalized layer which is usually less than 1000Å thick and usually less than 200Å thick and greater than 5Å, with a typical thickness being in the range of about 30 to 100Å.

The result is an aluminum surface having a coating formed thereon and bonded to the aluminum surface comprising a first hydroxylated layer and a layer of phosphonic and/or phosphinic acid or phosphoric acid ester bonded to the aluminum hydroxide layer.

With respect to the bonding of the phosphonic and/or phosphinic acid molecule or phosphoric acid ester to the aluminum hydroxide surface, while we do not wish to be bound by any particular theory of bonding, a layer of phosphonic/phosphinic acid is formed or bonded uniformly to the hydroxyl layer.

The reaction is believed to be as follows:

Phosphonic + Aluminum
Acid Molecule   Hydroxide

Figure 9:
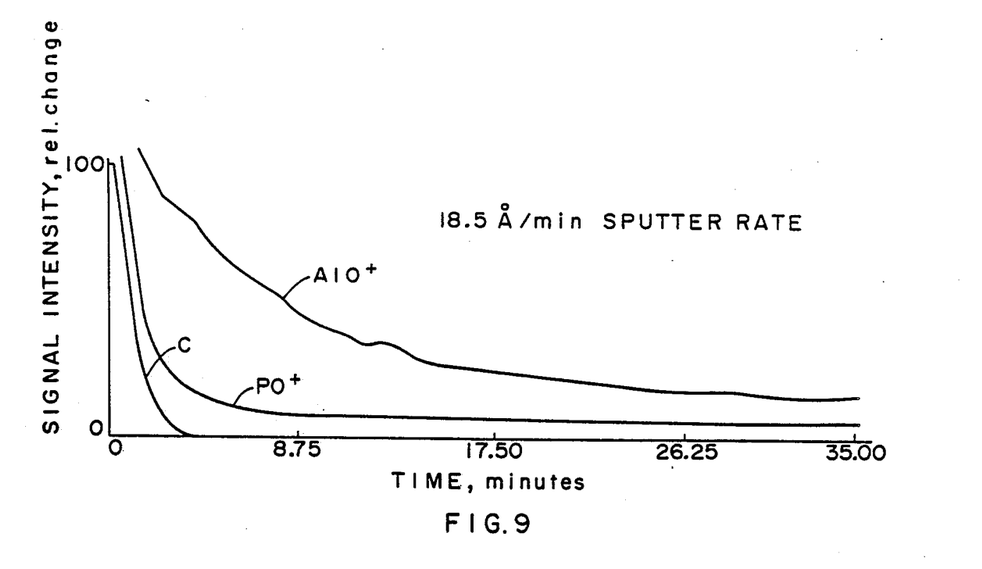
FIG. 9 is a depth profile analysis by Secondary Mass Spectroscopy (SIMS) of the coatings of the invention.

Examination of the layers of the subject invention by Electron Spectroscopy for Chemical Analysis (ESCA) shows a high ratio of aluminum to phosphorus. That is, aluminum can be about 6 to 30 times that of phosphorus. This shows that the organic acids are not incorporated into the oxide barrier layer but are bonded on the surface of the layer. That is, depth profiles by Secondary Ion Mass Spectroscopy (SIMS) of the duplex layer or coating formed in accordance with the subject invention using phenyl phosphonic acid (FIG. 9) shows the amount of carbon and phosphorus dropping very quickly in the first minutes of sputter etching. This shows that these elements (carbon and phosphorus) are on the surface.

Another method of applying the functionalized layer includes anodizing the sheet product. That is, the sheet product may be immersed in the treatment liquid, e.g., liquid containing phosphonic or phosphinic acid or phosphoric acid esters or combinations thereof, in an anodizing apparatus in which the treatment liquid is maintained at a temperature which may range from just above freezing to just below boiling, preferably from about 5° C. to about 60° C. The temperature is selected such that the solubility of phosphonate, phosphinate or phosphate ester complexes of aluminum are low. It will be appreciated that the liquid or electrolyte may also contain inorganic acids such as sulfuric, phosphoric, chromic and boric or organic acids such as oxalic, maleic, tartaric, etc.

The aluminum surface is electrically connected to the positive terminal of a power supply. A counter electrode is then connected to the negative electrode of the power supply.

The cleaned aluminum surface is then anodized at a voltage in the range of 1 to 400 volts, preferably from about 20 to 90 volts. Voltage used may be of several types, e.g., square wave, asymmetrical square wave, asymmetrical sine wave or saw tooth asymmetrical.

The result is an aluminum surface having a coating formed thereon and bonded to the aluminum surface comprising a first layer of anodically formed aluminum oxide and a layer of phosphonic or phosphinic acid or phosphoric acid esters, preferably monomeric phosphonic/phosphinic acid bonded to the aluminum oxide layer.

The oxide layer may be the porous or the non-porous type and is functionalized as in FIG. 8. FIG. 8 represents the outer surface of the duplex coating and, also, the inner pore walls of porous type duplex coatings.

The thickness of the resulting functionalized oxide layer is in the range of 3–5000Å and preferably 5 to 500Å.

Examination of the layers of the subject invention by Electron Spectroscopy for Chemical Analysis (ESCA) shows a high ratio of aluminum to phosphorus. That is, aluminum can be about 6 to 30 times that of phosphorus. For example, the ratio of aluminum to phosphorus when mono vinyl phosphonic acid, allylphosphonic acid, and phenyl phosphonic acid were used as electrolytes were 24.1/3.0, 27.8/1.6, and 33.1/1.4, respectively. The phosphorus to aluminum ratio can range from 0.001 to 0.5, preferably, 0.02 to 0.2. See Table 1 below.

| Atomic Concentrations Determined by ESCA (%) | | | | | |
|---|---|---|---|---|---|
| Sample | Al | O | P | C | Al/P |
| 1 M VPA[1] | 24.1 | 27.1 | 3.0 | 45.8 | 8.00 |
| 1 M APA[2] | 27.8 | 30.8 | 1.6 | 39.8 | 17.2 |
| 1 M PPA[3] | 25.6 | 43.8 | 0.9 | 26.4 | 28.4 |

[1]Mono vinyl phosphonic acid
[2]Allylphosphonic acid
[3]Phenyl phosphonic acid

Figure 10:
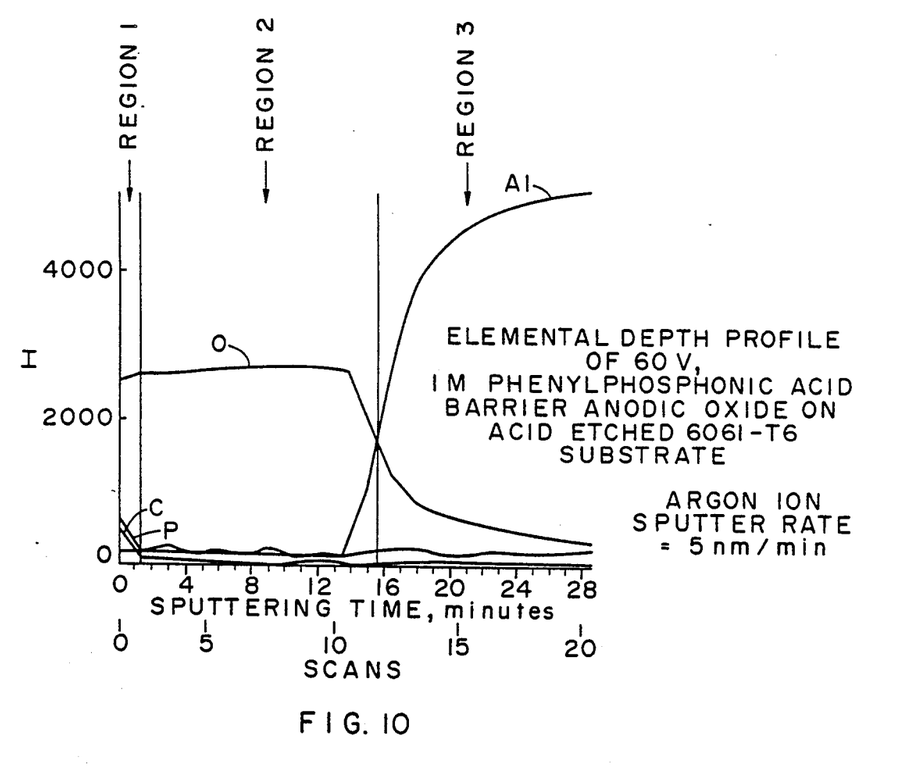
FIG. 10 is a depth profile analysis by AES of a multi-layer coating of the present invention formed by treatment with phosphonic acid.

Sputtering depth profiles by Auger Electron Spectroscopy (AES) of a coating formed in accordance with the subject invention using phenyl phosphonic acid (FIG. 10) shows the amount of carbon and phosphorus decreasing very quickly in the first minute of sputtering (50Å/min). This shows that these elements (carbon and phosphorus) are on the surface and constitute the functionalized layer. By comparison, oxygen concentration starts and is maintained at a high level for about the first 15 minutes before starting to drop off when the aluminum signal of the base metal starts to increase, showing the anodic oxide layer has a relatively constant composition of $Al_2O_3$.

Polymer formulations which may be used are epoxies, phenolic or polyester modified epoxies, poly(vinyl chloride), carboxylated, epoxy or melamin modified, PVC-vinyl acetate copolymers, ethylene vinyl acetate, polyesters, acrylic resins, polyethylene, other polyolefins or mixtures, polyamides, polystyrene and polyurethanes.

Thus, it will be seen that metal surfaces can be modified by the use of the functionalized layer to achieve higher performance in all types of coating and laminating.

Sheet stock produced in accordance with the present invention is suitable for use in can bodies or as end stock for easy open ends particularly when coated with a polymeric material. Such polymeric materials can be applied to the duplex coatings of the invention with resulting superior bond strengths, particularly if such polymeric coatings are bonded using reactive groups on the functionalized layer. The polymer coatings can be applied, for example, by spraying, dipping, roll coating, laminating, powder coating and then formed into containers.

Coatings in accordance with the invention were prepared as set forth in the following Examples.

EXAMPLE 1

AA5042 alloy sheet, 0.010 inch thick, was cleaned by immersion in sodium carbonate solution, rinsed with water and then treated for 10 seconds in boiling water adjusted to pH 9 with triethanolamine. After rinsing with water, the sheet was immersed for another 10 seconds in a 1 molar solution of vinylphosphonic acid at room temperature. After rinsing and drying, the sheet was examined by SIMS depth profiling analysis and found to have a carbon/phosphorus layer over an aluminum oxide/hydroxide layer. Next, the sheet was coated with a solvent-based, epoxymodified polyvinylchloride coating. After curing of the polymer coating, the sheet was bent 180°, and the bent area was flattened by dropping a weight on it (impact bend test). The coating was examined after this test and given an adhesion rating of 5, i.e., the highest on a scale of 1–5.

EXAMPLE 2

Samples of AA3003, 0.005 inch thick, foil were treated as in Example 1. One set of samples was coated with a polyvinyl chloride coating, a second one with an epoxy coating. After curing, the dry coatings were tested with the tape adhesion test. No failure was observed. The samples were then immersed for 45 minutes in boiling water and tested by the tape adhesion test. Again, no failure was observed.

EXAMPLE 3

Samples having the treatments and coatings as in Example 3 were subjected to even more severe test procedures. That is, samples were subjected to a solution of lactic acid in water for 30 minutes at 175° C. (350° F) or to a mixture of lard and water under the same time/temperature conditions. Tape tests after these treatments showed no loss of adhesion and visual inspection did not reveal blistering of the coating.

EXAMPLE 4

AA5042 was used for test specimens which were cleaned in an alkaline solution and anodized at 10 or 40 volts for 10 seconds in 9 wt. % or 18 wt. % vinyl phosphonic acid. In addition, these specimens were then coated with a polyvinylchloride polymer and fabricated into cans. The performance was equivalent to that of metal receiving a conventional chromate conversion coating in terms of coating adhesion and resistance to corrosion under test conditions simulating processing and storage of filled containers. The vinylphosphonic acid treated cans had an average sidewall adhesion tape test result of 95% adhesion, whereas the conventional chromate conversion coated cans had an average 91% sidewall adhesion with the tape test.

EXAMPLE 5

AA5182 was used for test specimens which were cleaned in alkaline solution and anodized at 10 or 40 volts for 10 seconds in 9 wt. % or 18 wt. % vinyl phosphonic acid. In addition, these specimens were then coated with an epoxy melamine polymer and fabricated into can end stock. The performance was equivalent to that of metal receiving a conventional chromate conversion coating in terms of adhesion and resistance to corrosion under test conditions simulating processing storage of filled containers. All samples passed adhesion and corrosion tests after treatment in 160° F. water and 160° F. beer.

EXAMPLE 6

This example was the same as Example 4 except that the cleaned sheet was anodized at 10 volts for 10 seconds in a solution containing 15 wt. % vinylphosphonic acid and 7.5 wt. % phosphoric acid. After forming into cans, the anodized sheet had an average sidewall adhesion tape test result of 99% adhesion, compared to 91% adhesion for conventional chromate conversion coated sheet.

EXAMPLE 7

This example was the same as Example 5 except the cleaned sheet was anodized at 10 volts for 10 seconds in a solution containing 15 wt. % vinylphosphonic acid and 7.5 wt. % phosphoric acid. After forming into easy open ends, the ends passed all adhesion, corrosion and feathering tests. Furthermore, the anodized ends had an average enamel rating of 0.06 mA compared to 0.12 mA for conventional chromate conversion coated sheet. Feathering is a measure of coating adhesion after opening the ends. Enamel rating is an electrical measure of coating continuity.

EXAMPLE 8

Specimens of AA3003 alloy, anodized at 20 volts in 20 wt. % hydrogen phosphonic acid at 23° C. for 10 seconds, were coated with polyvinyl chloride or polyvinyl acetate, to provide a high level of adhesion. There was no loss of adhesion when treated in lactic acid or lard/water solutions for 30 minutes at 350° F.

EXAMPLE 9

AA3003 foil (0.005"), both -o and -H19 tempers, was boiled for 10 seconds in water containing triethylamine at pH 9. The foil was rinsed with deionized water and then dipped in 18 wt. % vinylphosphonic acid solution for 10 seconds. The foil was rinsed with deionized water, dried and coated with polyvinyl chloride or polyvinyl acetate to provide a high level of adhesion. There was no loss of coating adhesion after treatments for 30 minutes at 350° F. in: 1) lactic acid/salt solution; 2) lard/water; 3) ketchup/vinegar/vegetable oil; 4) lemon juice; 5) orange oil; or 6) hot sauce.

EXAMPLE 10

This example was the same as Example 9 except that the boiled foil was dipped in 5% hydrogen phosphonic acid for 10 seconds. There was no loss of adhesion after treatment in the various process mixtures.

EXAMPLE 11

This example was the same as Example 9 except the boiled foil was dipped in 1 wt. % phytic acid. There was no loss of adhesion after treatment in the various process mixtures.

EXAMPLE 12

This example was the same as Example 9 except that the foil was first boiled in 0.1 m tribasic sodium phosphate solution for 10 seconds. The foil was rinsed, then dipped in 18% vinylphosphonic acid for 10 seconds then coated as in Example 8. There was no loss of coating adhesion after treatment in the various process mixtures.

Thus, the invention provides a process for forming a protective coating on a metal surface comprising a first layer of a metal hydroxide and a layer of phosphonic-/phosphinic acid phosphoric acid ester chemically bonded to the metal oxide or hydroxide layer.

Having thus described the invention, what is claimed is:

1. A method of fabricating a food or beverage container or container panel comprising the steps of:
   (a) providing a body of aluminum base alloy;
   (b) working said body to a sheet product;
   (c) providing a coating of at least one of aluminum oxide and aluminum hydroxide thereon;
   (d) thereafter, treating said coating with an organic phosphorus-containing compound to chemically bond a functionalized layer of said organic phosphorus-containing compound on said coating;
   (e) applying a polymer coating on said functionalized layer to provide a coated sheet product; and
   (f) forming said coated sheet product into food or beverage containers or container panels.

2. The method in accordance with claim 1 including the step of cutting blanks from said coated sheet product.

3. The method in accordance with claim 1 wherein said forming includes drawing said coated sheet product into a cup shaped container.

4. The method in accordance with claim 1 wherein said forming includes drawing and redrawing to form a cup shaped container.

5. The method in accordance with claim 1 wherein said forming includes drawing and ironing to form a food or beverage container.

6. The method in accordance with claim 1 wherein the coating is an aluminum hydroxide coating formed by treatment with a solution at a pH in the range of 2 to 14.

7. The method in accordance with claim 50 wherein the pH is in the range of 7 to 10.

8. The method in accordance with claim 6 wherein the treating is at a temperature of from room temperature to 200° C.

9. The method in accordance with claim 6 wherein the treating is at a temperature of from room temperature to 100° C.

10. The method in accordance with claim 6 wherein the treating is at a temperature of from 50° to 100° C.

11. The method in accordance with claim 6 wherein the treating is in an aqueous solution containing a material selected from the group consisting of triethanol amine, propyl amine, triethyl amine, alkali metal hydroxide, alkaline earth metal hydroxide, ammonium hydroxide, alkali metal carbonate and bicarbonate, alkali metal phosphate or alkali metal silicate.

12. The method in accordance with claim 6 wherein the treating is with triethylamine.

13. The method in accordance with claim 6 wherein the treating is at least 1 second.

14. The method in accordance with claim 6 wherein the treating is from 1 to 100 seconds.

15. The method in accordance with claim 1 wherein said acid comprises a solution having a concentration ranging from about 0.001 molar to a saturated solution of said acid.

16. The method in accordance with claim 1 wherein said acid comprises a solution having a concentration ranging from about 0.1 to about 2 molar of said acid.

17. The method in accordance with claim 1 wherein said acid is selected from the class consisting of:
(a) a compound having the formula $R_m(PO(OH)_2)_n$ wherein R is one or more radicals having a total of 1-30 carbons; m is a number 1 to 10 and is the number of radicals; and n is a number 1 to 10 and is the number of phosphonic acid groups; and
(b) a compound having the formula $R_mR'_o(PO(OH))_n$ wherein R is one or more radicals having a total of 1-30 carbons; m is a number 1 to 10 and is the number of R radicals; R' may be comprised of 1-30 carbon-containing radicals; o is a number 1 to 10 and is the number of R' radicals; and n is a number 1 to 10 and is the number of phosphinic acid groups; and mixtures of the compounds in (a) and (b).

18. The method in accordance with claim 1 wherein said acid ia soluble phosphonic acid having the formula $R_m(PO(OH)_2)_n$ wherein R is one or more radicals having a total of 1-12 carbons; m is a number 1 to 10 and is the number of radicals; and n is a number 1 to 10 and is the number of phosphonic acid groups.

19. The method in accordance with claim 1 wherein said acid is a soluble phosphinic acid having the formula $R_mR'_o(PO(OH))_n$ wherein R is one or more radicals having a total of 1-12 carbons; m is a number 1 to 10 and is the number of R radicals in the compound and is in the range of 1-10; R' may be comprised of 1-30 carbon-containing radicals; o is a number 1 to 10 and is the number of R' radicals; and n is a number 1 to 10 and is the number of phosphinic acid groups.

20. The method in accordance with claim 19 wherein the compound is hydrogen phosphonic acid.

21. The method in accordance with claim 1 wherein the sheet product is fabricated from an aluminum alloy selected from AA3000 and AA5000 series alloys.

22. The method in accordance with claim 1 wherein the sheet product is fabricated from AA5182 and AA5352 and formed into ends for beverage containers.

23. The method in accordance with claim 1 wherein the functionalized layer has a thickness of less than 1000Å.

24. The method in accordance with claim 1 wherein the functionalized layer has a thickness of less than 200Å.

25. The method in accordance with claim 1 wherein the functionalized layer has a thickness of less than 100Å.

26. The method in accordance with claim 1 wherein the functionalized layer has a thickness in the range of 5 to 50Å.

27. The method in accordance with claim 1 wherein the functionalized layer and in step (c) have a phosphorus to aluminum ratio of about 0.01 to 1.

28. The method in accordance with claim 1 wherein said compound comprises a water soluble phosphoric acid material selected from the class consisting of:
(a) a phosphoric acid ester salt having the formula $(RO)PO(OX)_2$ or $(RO)PO(OH)(OX)$ or $(RO)(R'O)PO(OX)$ wherein R or R' is one or more radicals having a total of 1-30 carbons and X is ammonia, hydrogen, or a metal selected from alkali, alkaline earth and transition metals; and
(b) phosphoric acid ester selected from $(RO)_m(PO(OH)_2)_n$ or $(RO)_m(R'O)_k(PO(OH))_n$ and $(RO)_m(R'O)_k(R''O)_q(PO)_n$ wherein R is one or more radicals having a total of 1-30 carbons; R' and R'' is one or more radicals having a total of 1-30 carbons; m, k or q is a number 1 to 12 and is the number of radicals RO, R'O or R''O, respectively; and n is a number 1 to 12 and is the number of phosphoric acid groups; and
mixtures of the acid ester salt and the acid ester.

29. The method in accordance with claim 1 wherein said compound comprises a phosphoric acid ester having the formula $(RO)_m(PO(OH)_2)_n$ wherein R is one or more radicals having a total of 1-12 carbons; m is a number 1 to 12 and is the number of radicals; and n is a number 1 to 12 and is the number of phosphoric acid groups.

30. The method in accordance with claim 1 wherein said compound comprises a water soluble phosphoric acid ester having the formula $(RO)_m(R'O)_o(PO(OH))_n$ wherein R is one or more radicals having a total of 1-12 carbons; m is a number 1 to 12 and is the number of R radicals; R' may be comprised of 1-30 carbon-containing radicals; o is a number 1 to 12 and is the number of R' radicals; and n is a number 1 to 12 and is the number of phosphoric acid groups.

31. A method of fabricating food or beverage containers or container panels comprising the steps of:
(a) providing a body of aluminum base alloy;
(b) working said body to a sheet product;
(c) subjecting the sheet product to a treatment in an aqueous solution containing triethylamine at a temperature in the range of room temperature to 100° C. and having a pH in the range of 8 to 10 to form a layer of aluminum hydroxide on said substrate;
(d) thereafter treating said sheet product with a phosphorus-containing acid selected from phosphinic acid, phosphonic acid and phosphoric acid ester having a concentration of 0.1 to 2 molar to form a functionalized layer on said aluminum hydroxide layer, the functionalized layer comprised of the reaction product of said acid and the layer of aluminum hydroxide and having a thickness of less than 200Å;
(e) applying a polymer coating on said functionalized layer to provide a coated sheet product; and
(f) cutting blanks from said coated sheet product; and
(g) forming said blanks into food or beverage containers or container panels.

32. A method of fabricating food or beverage containers or container panels comprising the steps of:
(a) providing a body of aluminum base alloy;
(b) working said body to a sheet product;
(c) anodizing said sheet product in an acid having an organic phosphorus-containing compound to form an aluminum oxide layer and a functionalized layer on the sheet product;
(d) applying a polymer coating on said functionalized layer to provide a coated sheet product; and
(e) forming said coated sheet product into food or beverage containers or container panels.

33. The method in accordance with claim 32 wherein the phosphorus-containing compound is selected from phosphonic and phosphinic acid.

34. The method in accordance with claim 33 wherein the acid is a monomeric phosphonic or phosphinic acid.

35. The method in accordance with claim 32 wherein the organic phosphorus-containing compound is selected from phosphonic and phosphinic acid or phosphoric acid ester.

36. The method in accordance with claim 32 wherein the acid is selected from the class consisting of:

(a) a compound having the formula $R_m(PO(OH)_2)_n$ wherein R is one or more radicals having a total of 1-30 carbons; m is a number 1 to 10 and is the number of radicals; and n is the number of phosphonic acid groups; and
(b) $R_mR'_o(PO(OH))_n$ wherein R is one or more radicals having a total of 1-30 carbons; m is a number 1 to 10 and is the number of R radicals; R' may be comprised of 1-30 carbon-containing radials; o is a number 1 to 10 and is the number of R' radicals; and n is a number 1 to 10 and is the number of phosphinic acid groups; and mixtures of the compounds in (a) and (b).

37. The method in accordance with claim 32 wherein said acid comprises a soluble phosphonic acid having the formula $R_m(PO(OH)_2)_n$ wherein R is one or more radicals having a total of 1-12 carbons; m is a number 1 to 10 and is the number of radicals; and n is a number 1 to 10 and is the number of phosphonic acid groups.

38. The method in accordance with claim 32 wherein said acid comprises a soluble phosphinic acid having the formula $R_mR'_o(PO(OH))_n$ wherein R is one or more radicals having a total of 1-12 carbons; m is the number of R radicals; R' may be comprised of 1-30 carbon-containing radicals; o is a number 1 to 10 and is the number of R' radicals; and n is a number 1 to 10 and is the number of phosphinic acid groups.

39. The method in accordance with claim 38 wherein the acid is hydrogen phosphonic acid.

40. The method in accordance with claim 32 wherein said acid comprises a soluble monomeric phosphonic acid having the formula $RPO(OH)_2$ where R is a 1-12 carbon-containing monomeric radical.

41. The method in accordance with claim 32 wherein said acid comprises a soluble monomeric phosphinic acid having the formula $RR'PO(OH)$ where both R and R' may each be comprised of 1-12 carbon-containing monomeric radicals.

42. The method in accordance with claim 32 wherein said acid comprises a soluble phosphoric acid ester selected from the class consisting of:
(a) a phosphoric acid ester salt having the formula $(RO)PO(OX)_2$ or $(RO)PO(OH)(OX)$ or $(RO)(R'O)PO(OX)$ wherein R or R' is one or more radicals having a total of 1-30 carbons and x is selected from ammonia, alkali, alkaline earth and transition metals; and
(b) or a compound having the formula $(RO)_m(PO(OH)_2)_n$ or $(RO)_m(R'O)_k(PO(OH))_n$ or $(RO)_m(R'O)_k(R''O)_q(PO)_n$ wherein R is one or more radicals having a total of 1-30 carbons; R' and R'' is one or more radicals having a total of 1-30 carbons; m, k or q is a number 1 to 12 and is the number or radicals RO, R'O or R''O, respectively; and n is a number 1 to 12 and is the number of phosphoric acid groups; and mixtures of the compounds in (a) and (b).

43. The method in accordance with claim 42 wherein said acid ester comprises a soluble phosphoric acid ester having the formula $RO_{m\ n}$ wherein R is one or more radicals having a total of 1-12 carbons; m is a number 1 to 10 and is the number of radicals and is i the range of 1-10; and n is the number of phosphoric acid groups and is in the range of 1-10.

44. The method in accordance with claim 43 wherein said acid ester comprises a water soluble phosphoric acid ester having the formula $(RO)_m(R'O)_o(PO(OH))_n$ wherein R is one or more radicals having a total of 1-12 carbons; m is a number 1 to 12 and is the number of R radicals; R' may be comprised of 1-30 carbon-containing radicals; o is a number 1 to 12 and is the number of R' radicals; and n is a number 1 to 12 and is the number of phosphoric acid groups.

45. The method in accordance with claim 32 wherein said acid comprises an aqueous solution having a concentration ranging from about 0.001 molar to a saturated solution of said acid.

46. The method in accordance with claim 32 wherein said acid comprises forming an aqueous solution having a concentration ranging from about 0.1 to about 2 molar of said acid.

47. The method in accordance with claim 32 wherein the sheet product is fabricated from an aluminum alloy selected from AA3000 and AA5000 series alloys.

48. The method in accordance with claim 33 wherein the sheet product is fabricated from AA5182 and AA5352 and formed into ends for beverage containers.

49. The method in accordance with claim 33 wherein the oxide layer has a thickness of 100 to 5000Å.

50. The method in accordance with claim 33 wherein the functionalized layer has a thickness of less than 200Å.

51. The method in accordance with claim 33 wherein the functionalized layer has a thickness of less than 100Å.

52. The method in accordance with claim 33 wherein the functionalized layer has a thickness of less than 30Å.

53. The method in accordance with claim 33 wherein the functionalized layer and the oxide layer have a phosphorus to aluminum ratio of about 0.001 to 0.5.

54. A method of fabricating food or beverage containers or container panels comprising the steps of:
(a) providing a body of aluminum base alloy;
(b) working said body to a sheet product;
(c) providing an aluminum substrate as an anode in an anodizing electrolyte comprised of a water containing solution having a phosphorus-containing organic compound selected from the group consisting of phosphinic acids, phosphonic acids and phosphoric acid esters;
(d) anodizing said substrate under conditions to form an oxide layer having a thickness of 100 to 5000Å on said aluminum substrate and a functionalized layer on a surface of said barrier layer, the functionalized layer having a thickness of less than 200Å, the oxide and functionalized layer having a phosphorus to aluminum ratio of 0.001 to 0.5;
(e) applying a polymer coating on said functionalized layer to provide a coated sheet product; and
(f) forming said coated sheet product into food or beverage containers or container panels.

55. In the method of producing a food or beverage container or container panel wherein an aluminum alloy is formed to produce said container or container panel from a sheet product of said alloy, the improvement comprising:
(a) providing a coating of at least one of aluminum oxide and aluminum hydroxide on the sheet product;
(b) thereafter, treating said coating with an organic phosphorus-containing compound to chemically bond a functionalized layer of said organic phosphorus-containing compound on said coating;
(c) applying a polymer coating on said functionalized layer to provide a coated sheet product; and (d) forming said coated sheet product into food or beverage containers or container panels.

56. In the method of producing a food or beverage container or container panel wherein an aluminum alloy is formed to produce a lid for said container from a sheet product of said alloy, the improvement comprising:

(a) providing a coating of at least one of aluminum oxide and aluminum hydroxide on the sheet product;

(b) thereafter, treating said coating with an organic phosphorus-containing compound to chemically bond a functionalized layer of said organic phosphorus-containing compound on said coating;

(c) applying a polymer coating on said functionalized layer to provide a coated sheet product; and (d) forming said coated sheet product into a lid for said container.

* * * * *

UNITED STATES PATENT AND TRADEMARK OFFICE
CERTIFICATE OF CORRECTION

PATENT NO. : 5,103,550

DATED : April 14, 1992

INVENTOR(S) : Karl Wefers, Gary A. Nitowski and Larry F. Wieserman

It is certified that error appears in the above-identified patent and that said Letters Patent is hereby corrected as shown below:

Col. 6, lines 12-13    Change "R, R and/or" to --R, R' and/or--.

Col. 13, line 18    Change "ia" to --is a--.
Claim 18

Col. 15, line 60    Change "$RO_{mn}$" to --$RO_m[PO(OH)_2]_n$--.
Claim 43

Col. 15, line 62    Change "is i" to --is in--.
Claim 43

Signed and Sealed this

Twenty-fourth Day of August, 1993

Attest:

BRUCE LEHMAN

Attesting Officer

Commissioner of Patents and Trademarks